Patented Oct. 11, 1938

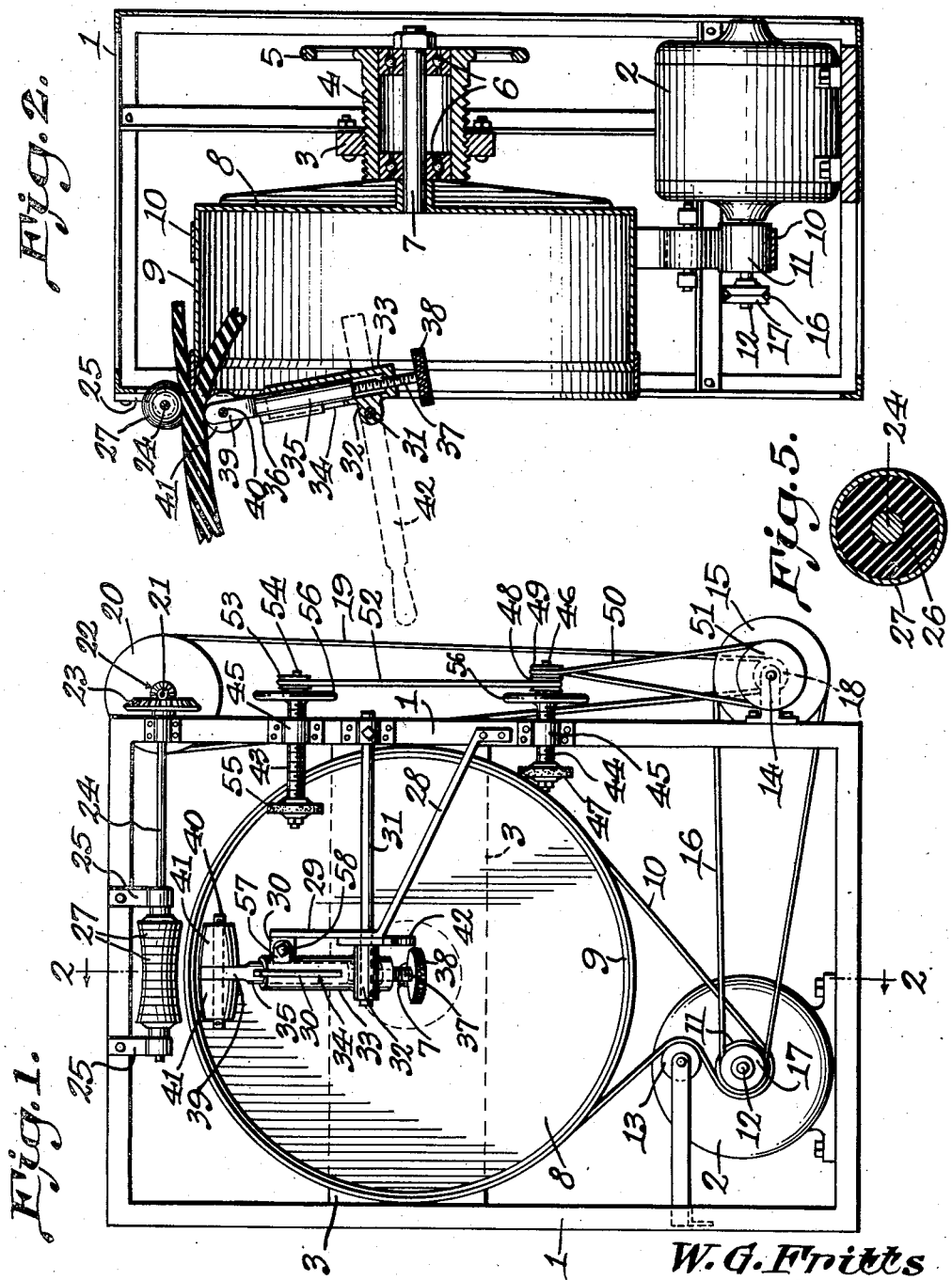

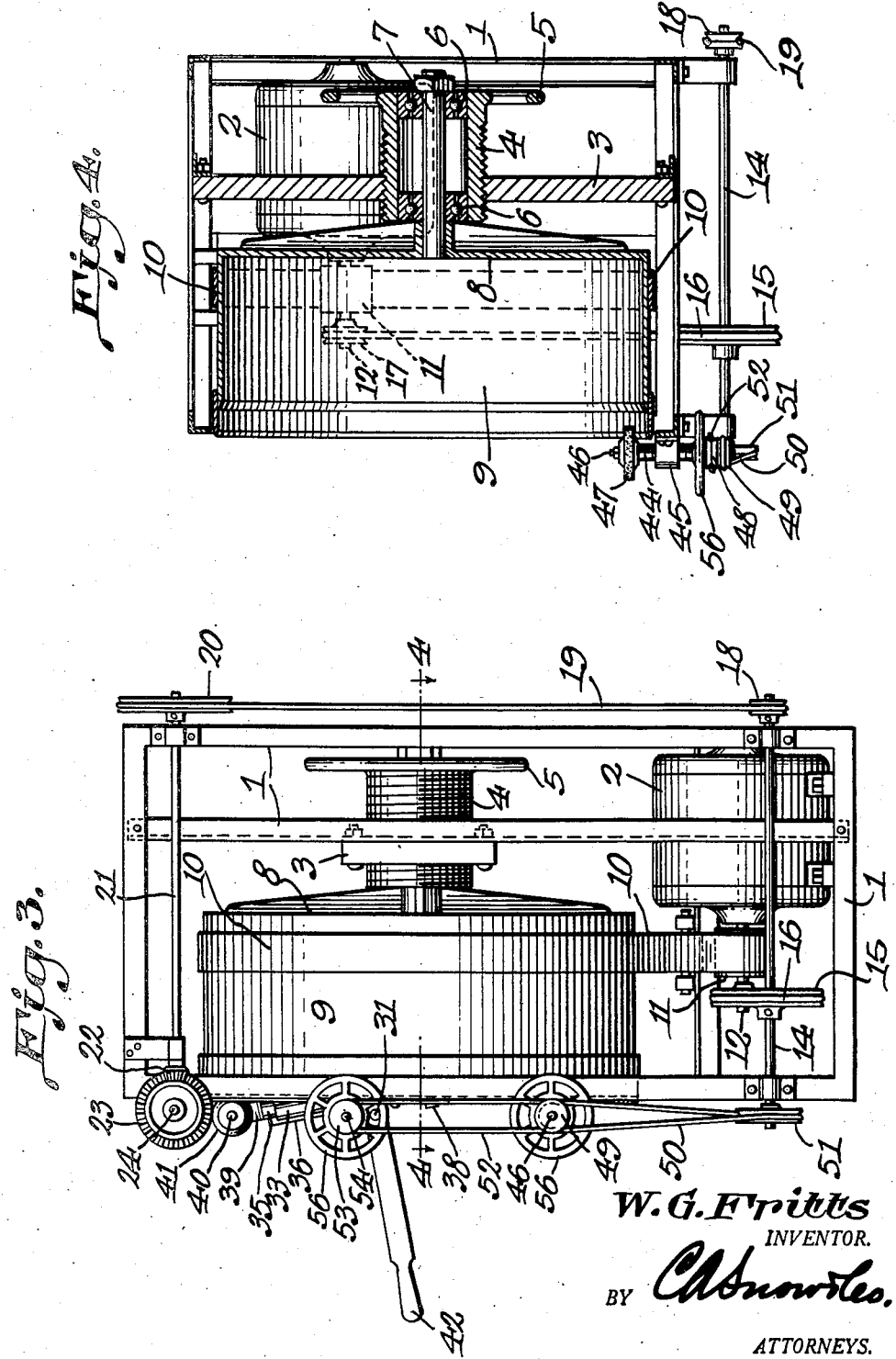

2,132,896

UNITED STATES PATENT OFFICE 2,132,896

TIRE TREAD REMOVER

Wilfred Guy Fritts, Lexington, N. C.

Application December 30, 1937, Serial No. 182,606

4 Claims. (Cl. 164—61)

This invention relates to a machine for removing tire treads and is designed primarily as an improvement upon the structure shown for example in Patent 1,897,425 issued to me on February 14, 1933.

An object of the invention is to provide the machine with upper and lower feed rolls, the lower roll being mounted in a new and novel manner whereby it can readily be swung into and out of position within the tire so as to expedite placing and removing the tire.

A further object is to provide improved means for adjustably supporting the lower feed roll.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1 is a front elevation of the machine.

Figure 2 is a section on line 2—2, Figure 1, a portion of a tire being shown in engagement with the machine.

Figure 3 is a side elevation.

Figure 4 is a section on line 4—4, Figure 3.

Figure 5 is an enlarged section through the upper feed roll.

Referring to the figures by characters of reference 1 designates a frame of any suitable construction in the lower portion of which is mounted a motor 2 for operating the mechanism while at a point above the motor there is located a cross plate 3 in which is adjustably mounted a screw-threaded sleeve 4 which can be rotated by means of a wheel 5 or the like and constitutes the housing for bearings 6. These bearings are provided for the shaft or spindle 7 which projects from the center of the closed end 8 of a cylindrical knife 9 and obviously by rotating the sleeve or housing 4, this knife can be adjusted axially.

The cylindrical knife or cutter 9 acts as a pulley on which is mounted an endless belt 10 which is driven by a pulley 11 on the shaft 12 of motor 2. Thus when the motor operates this cylindrical cutter will rotate at a desired speed about the longitudinal axis of the shaft 7. The belt can be provided with any suitable tightener 13 which can be in the form of a pulley as shown particularly in Figure 1.

A counter-shaft 14 is journalled on the frame 1 and carries a pulley 15 adapted to receive motion through a belt 16 from a small pulley 17 on shaft 12. Another pulley, 18, on the counter-shaft 14 transmits motion through a belt 19 to a pulley 20 on a shaft 21 journalled upon the upper portion of the frame. This latter shaft has a gear 22 meshing with a gear 23 secured to a transverse shaft 24 located in front of the upper portion of the frame and mounted in suitable bearings such as hangers 25. Secured on this shaft directly above the central portion of the cylindrical cutter 9 is a rubber roll 26 the periphery of which is faced with a plurality of separately shiftable rings 27. These rings are preferably formed of metal and are so shaped and proportioned that they cooperate to form a roll with a concave periphery as shown particularly in Figure 1. However as the rings are supported on a roll 26 of soft rubber, they can yield separately so that this upper feed roll formed of the parts 26 and 27 thus will adapt itself automatically to the contour of the tire being acted on.

A bracket 28 is secured to one side of the frame at the front thereof and is extended laterally and upwardly, its upper end being formed with an upwardly extending arm 29 having a stop ear 30. A transverse stationary shaft 31 is secured to one side of frame 1 and extends through arm 29, this shaft constituting a support on which an ear 32 is mounted for oscillation. This ear is extended from the lower end portion of a guide sleeve 33 provided with a longitudinal slot 34 and slidable in this sleeve is a stem 35 having a fin 36 which projects into and slides within the slot 34, thus to hold the stem against rotation. A screw 37 is swiveled in the lower end of the stem and is threaded through the lower end of the sleeve 33. This screw has a head 38 or the like by which it can be rotated readily for the purpose of raising or lowering the stem 35 relative to sleeve 33.

The upper or outer end of stem 35 is flattened to form a head 39 through which extends a bearing pin 40. This pin extends in opposite directions from the head and its two end portions provide bearings for oppositely disposed tapered sections 41 of the lower feed roll. The contour of these sections is such as to conform substantially with the transverse curvature of the tire being acted upon.

A lever 42 is secured to one side of the ear or bearing sleeve 32 so as to move therewith and by means thereof the sleeve 33 and the parts carried thereby can be swung about the axis of shaft 31 so as to bring the lower roll 41 into or out of active position.

Upper and lower bearing sleeves 43 and 44 are mounted in brackets 45 on the front portion of the frame 1. The lower sleeve 44 contains a shaft 46 carrying a sharpening disk 47 at one end adapted to engage the outer side of the cylindrical cutter at the periphery thereof. Pulleys 48 and 49 are carried by the other end portion of shaft 46 and one of them is driven by a belt 50 receiving motion from a pulley 51 on counter-shaft 14 while the other pulley, 48, is adapted to transmit motion through a belt 52 to a pulley 53 on one end of a shaft 54 which is journalled in the sleeve 43. This latter shaft carries a sharpening disk 55 at its other end for engaging the inner side of the cylindrical cutter at the edge thereof. By means of handwheels 56 or the like the two sleeves 44 and 43 can be adjusted longitudinally so as to move the sharpening disks toward or from the edge of the cutter. This rotation of the sleeves is of course independent to the shafts 46 and 54 under the action of their driving belt.

A stop ear 57 is extended laterally from the sleeve 33 and carries a stop screw 58 which is adjustable in the ear and is adapted to move against stop 39 for the purpose of limiting the swinging movement of sleeve 33 in one direction.

When it is desired to use this machine for the purpose of stripping the tread portion from a tire, the lever 42 is swung downwardly. This will cause sleeve 33 and the parts carried thereby to swing downwardly so that the lower feed roll 41 will move away from the cutting edge of the cylindrical cutter 9. The tire is then moved laterally so as to encircle shaft 31, roll 41 and sleeve 33, with a portion of the tire extending into the space defined by the cutter 9. Lever 42 is then swung upwardly and this will cause the roll 41, which is convex, to swing upwardly against the inner surface of the tire and to compress it against the upper feed roll 27 which is concave. The machine is then set in operation with the result that the cutter 9 will be caused to rotate about the axis of the shaft 7 and as it rotates the tire is forced against the cutting edge so that the tread will be stripped and passed over the outer surface of the cutter while the remainder of the tire will move into the area defined by the cutter. Roll 41 of course supports the tire in proper position and as the tire is constantly fed toward the cutter, the roll 41 will constantly be pressed toward the cutter and does not require any means for holding it in place. This swinging movement will of course be limited by the screw 58 contacting with stop ear 30. After the stripping operation has been completed, lever 42 is swung downwardly, thereby swinging roll 41 downwardly away from the cutting edge. Thus the stripped tire can be removed laterally from off of roll 41 after which another tire can be placed in position and the foregoing operation repeated. Obviously by means of the sharpening devices 47 and 55, the cutting edge can be maintained sharp, it being understood that these sharpening elements can be used either while the machine is operating or whenever the sharpening of the cutter is necessary.

By means of the screw 37 the roll 41 can be adjusted upwardly or downwardly in order that the machine may be adapted to tires of different thicknesses.

What is claimed is:

1. A tire stripping machine including a cylindrical cutter, means for rotating the same, a concave feed roll outside of but adjacent to the cutter, means for rotating the same in one direction, a convex feed roll, a support therefor mounted for swinging movement, said support being spaced from the cutter to provide a clearance for the insertion of a tire into position between the rolls and encircling the supporting structure of the swinging roll.

2. A tire stripping machine including a cylindrical cutter, means for rotating the same, a concave feed roll mounted for rotation adjacent to the cutter, means for driving the same, a convex feed roll, a bracket extending partly across and adjacent to the cutter, an adjustable connection between the convex feed roll and the bracket, means for swinging said connection relative to the bracket, and means for limiting the swinging movement of said connection, there being a sufficient clearance between one side of the cutter and the bracket for the insertion of a tire while being placed in position encircling the bracket and between the rolls.

3. A tire stripping machine including a cylindrical cutter having a circular cutting edge, means for rotating the cutter, an upper feed roll, means for rotating the same, a bracket fixedly mounted and extending partly across the cutter, a sleeve mounted to swing relative to and supported by the bracket, a convex feed roll, adjustable means carried by the sleeve for supporting the convex roll adjacent to the cutting edge and the upper feed roll, means for swinging said sleeve relative to the bracket to move the convex feed roll toward and from the cutting edge, and means for limiting the movement of said roll in one direction, there being a clearance between the sleeve and cutter for the lateral insertion of a tire between the roll to encircle the sleeve and bracket.

4. A tire stripping machine including a cylindrical cutter having a circular cutting edge, means for rotating the same, a concave feed roll including yieldingly supported rings shiftable to conform to the transverse contour of the tread of a tire, a supporting structure extending partly across the cutter with one end spaced from the cutter, a structure mounted to swing on said end and toward or from the cutter substantially in the plane of the axis of rotation of the cutter, a convex feed roll adjustably supported by the swinging structure, said rolls cooperating to grip a tire and feed it annularly toward the cutter and into the area surrounded by the cutting edge, there being sufficient clearance between the end of the supporting structure and the cutter for the insertion of a tire thereinto into position between the rolls and around said structure.

WILFRED GUY FRITTS.